Jan. 16, 1923.

W. H. P. MacDONALD.
WIND MOTOR.
FILED FEB. 4, 1920.

INVENTOR
W. H. P. MacDonald
BY
ATTORNEY

Jan. 16, 1923.
W. H. P. MacDONALD.
WIND MOTOR.
FILED FEB. 4, 1920.
1,442,350.
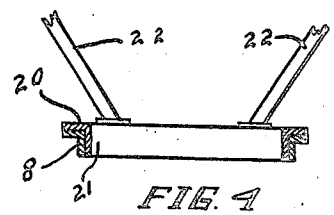
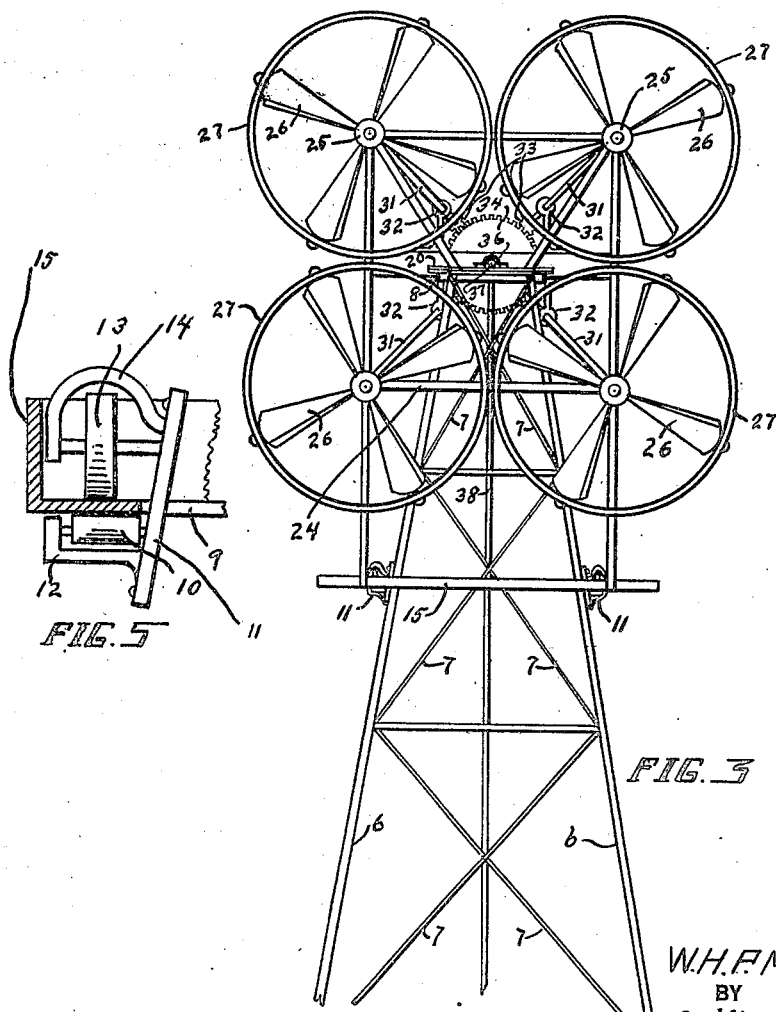
INVENTOR
W.H.P. MacDonald
BY
Milton S. Crandall
ATTORNEY Patented Jan. 16, 1923.

1,442,350

UNITED STATES PATENT OFFICE.

WILLIAM H. P. MacDONALD, OF SIOUX CITY, IOWA.

WIND MOTOR.

Application filed February 4, 1920. Serial No. 356,297.

*To all whom it may concern:*

Be it known that I, WILLIAM H. P. MAC-DONALD, a citizen of the United States, and a resident of Sioux City, in the county of Woodbury and State of Iowa, have invented certain new and useful Improvements in Wind Motors, of which the following is a specification.

This invention has for its object the production of a wind-motor, embodying a tower, the upper portion of which is enclosed by a frame carrying wind-actuated mechanism and rotatably supported by the tower in such fashion as to insure stability of the device against high wind, and yet permit free turning of the frame to place the wind-actuated mechanism in operative relation to the wind.

Furthermore, the invention contemplates a wind-motor embodying certain novel features of construction and arrangement of parts whereby a maximum of power is obtained from a comparatively simple and inexpensive construction.

The above and other objects and advantages I successfully attain in the structure hereinafter described, defined in the appended claim and illustrated in the accompanying drawings, in which like characters of reference indicate corresponding parts throughout the several views, of which,—

Fig. 3 is a front elevation thereof with a part cut away;

Fig. 4 is an enlarged transverse section of the upper bearing and associated parts; and Fig. 5 is an enlarged elevation of one pair of the frame bearings and associated parts.

Figure 1:
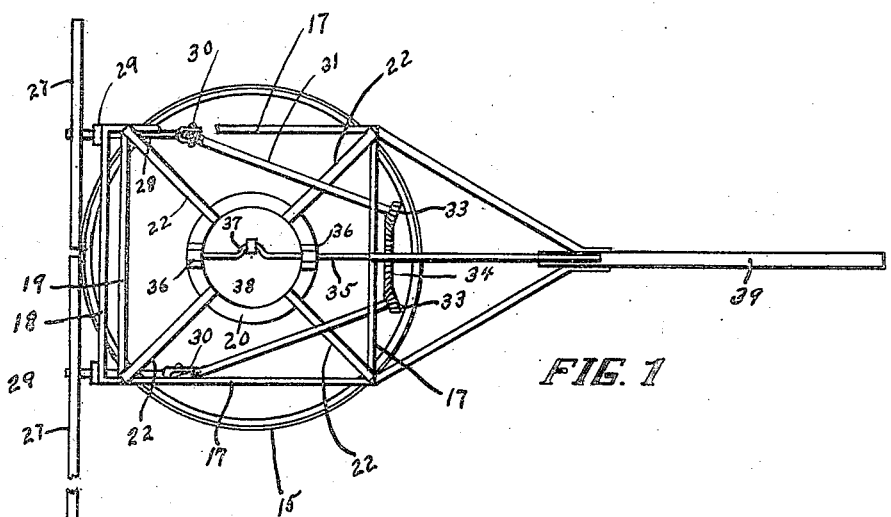
Fig. 1 is a plan of a wind motor constructed in accordance with the invention.
Figure 2:
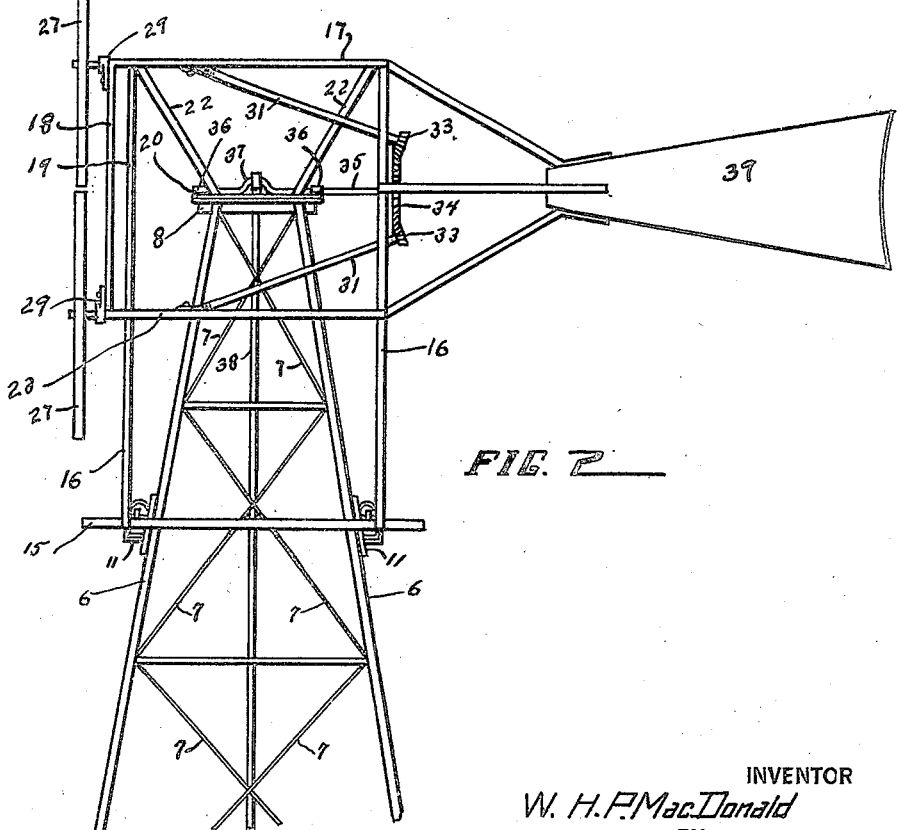
Fig. 2 is a side elevation thereof, a part being cut away.

While I have illustrated, and hereinafter described but one embodiment of the invention, I would not be understood as being limited to such specific structure, for various alterations and modification may be made in the details of construction and arrangement of parts, without departing from the spirit and scope of the invention, as defined in the appended claim.

Referring, now, to the illustrations, the embodiment illustrated, consists of a suitable tower, preferably embodying posts, 6, interconnected by suitable braces, 7, and an angle-iron ring, 8, mounted on the upper ends of the posts. The upper portion of the tower is enclosed by a rotatable frame, including a circular base or ring, 9, which encircles the tower a considerable distance below the top thereof. The base, 9, is rotatably supported by suitable bearings mounted on the posts, 6, and preferably including friction rollers, 10, each having one end rotatably supported by a plate, 11, mounted on the associated post; and the other rotatably supported by a suitable bracket-arm, 12, carried by the plate. The base rests upon the roller, 10, and is held against displacement therefrom as by rollers, 13, positioned above the base and suitably supported by the plates, 11, and bracket-arms, 14, thereon. The base, 9, is preferably provided with an outer flange, 15, engageable with the bracket-arms, 14, to prevent movement of the base transversely of the tower. The base supports four equally spaced uprights, 16, interconnected at their upper ends by a rectangular frame, including side members, 17, front and rear cross members, 18, and a cross member, 19, positioned a distance from the rear of the front cross member, 18.

Upon the ring, 8, is rotatably mounted a ring, 20, preferably having a flange, 21, engageable with the inner periphery of the ring, 8, to prevent displacement of the ring, 20. The said ring, 20, is interconnected with the frame by inclined bars, 22. The intermediate portion of the uprights 16, carry a similar rectangular frame including side members, 23, and cross members, 24.

The above-described rotatable frame carries wind-actuated mechanism which in the present instance embodies four vane-wheels each embodying a hub, 25, vanes, 26, and a rim, 27, to which the outer ends of the vanes are secured. The said vane-wheels are arranged in a common vertical plane in front of the rotatable frame and in superposed pairs. The vane-wheels are fixed on short shafts, 28, journaled in suitable bearings, 29, mounted on the rotatable frame, the said shafts being connected by universal joints, 30, with inwardly inclined shafts, 31, journaled in suitable bearings, 32, mounted on the frames; and carrying pinions, 33, intermeshed with a large gear wheel, 34, mounted on a horizontal drive shaft, 35, journaled in bearings, 36, mounted on opposite sides of the ring, 20. At the center of the ring, 20, the said shaft, 35, is formed with a crank, 37, on which is connected a pitman, 38, which depends through the center of the tower to transmit power to any desired device.

At the rear of the device is a suitable tail-vane, 39, suitably secured to the rotatable frame to so turn the said frame that the vane-wheels are directed windwardly.

It will now be observed that with the rotatable frame mounted on the tower as illustrated and described, the structure will endure very high winds; and by the arrangement of the vane-wheels and their driving connections, great power is imparted to the drive shaft, 35.

Having thus described by invention, what I claim as new and desire to secure by Letters Patent of the United States is,—

A wind-motor embodying a suitable tower, a frame rotatably supported thereon, superposed pairs of vane-wheels at one side of the frame, shafts journaled on the frame, on which shafts the vane-wheels are respectively fixed, a horizontal drive shaft on the frame, a gear wheel fixed on the latter shaft and positioned at the side of the frame opposite the vane-wheels, gear wheels intermeshed with said first gear wheel, diagonal shafts carrying at one end said second gear wheels, and universal joints between said first shafts and the diagonal shafts.

In testimony whereof I have hereunto set my hand this 17 day of Oct., 1919.

WILLIAM H. P. MacDONALD.